US012616214B2

(12) United States Patent
Bhaskar et al.

(10) Patent No.: US 12,616,214 B2
(45) Date of Patent: May 5, 2026

(54) VEGETABLE CONTAINING SNACK PRODUCT

(71) Applicant: Frito-Lay North America, Inc., Plano, TX (US)

(72) Inventors: Ajay Rajeshwar Bhaskar, Allen, TX (US); Jorge C. Morales-Alvarez, Plano, TX (US); Naveen Chikthimmah, Plano, TX (US)

(73) Assignee: Frito-Lay North America, Inc., Plano, TX (US)

( * ) Notice: Subject to any disclaimer, the term of this patent is extended or adjusted under 35 U.S.C. 154(b) by 340 days.

(21) Appl. No.: 18/143,982

(22) Filed: May 5, 2023

(65) Prior Publication Data
US 2024/0365797 A1 Nov. 7, 2024

(51) Int. Cl.
*A21D 2/36* (2006.01)
*A21D 2/18* (2006.01)
(Continued)

(52) U.S. Cl.
CPC .............. *A21D 2/36* (2013.01); *A21D 2/186* (2013.01); *A21D 8/02* (2013.01); *A21D 10/002* (2013.01); *A21D 13/045* (2017.01); *A21D 13/066* (2013.01)

(58) Field of Classification Search
None
See application file for complete search history.

(56) References Cited

U.S. PATENT DOCUMENTS 3,886,291 A * 5/1975 Willard ................... A23L 19/19
426/808
5,268,187 A * 12/1993 Quinlan ................... A21C 3/02
425/DIG. 235
(Continued)

FOREIGN PATENT DOCUMENTS

AU 2019343955 4/2021
CN 1353580 A * 6/2002
(Continued)

OTHER PUBLICATIONS

"Determination of SpecificMechanicalEnergyDistrubution on a twin screw extruder" Journal of agriculture 1997, 67, pp. 277-287 (Year: 1997).*
(Continued)

Primary Examiner — Jyoti Chawla
(74) Attorney, Agent, or Firm — Barnes & Thornburg LLP; G. Peter Nichols

(57) ABSTRACT
A vegetable snack product includes a base starch, corn flour, whole vegetable flour other than potato and corn, vegetable powder other than potato and corn. The vegetable snack product provides at least 15% of real vegetables exclusive of potato and corn and has a bulk density between about 60 g/L to about 84 g/L. An exemplary method of making a vegetable snack product includes hydrating a dry mix containing a base starch, corn flour, whole vegetable flour other than potato and corn, and vegetable powder other than potato and corn to form a dough containing from 31.5% to 35.5% of moisture. The dough may be extruded through a die slot to form a continuous sheet that may be cut to form individual snack sized pieces, which are then fried pieces to form a vegetable snack product.

10 Claims, 2 Drawing Sheets

Mixing — 12
Pre-Conditioning — 14
Extruding — 16
Perforating — 18
Tempering — 20
Cutting — 22
Frying — 24
Seasoning — 26
Packaging — 28

(51) Int. Cl.

| | | |
|---|---|---|
| *A21D 8/02* | (2006.01) | |
| *A21D 10/00* | (2006.01) | |
| *A21D 13/045* | (2017.01) | |
| *A21D 13/066* | (2017.01) | |

(56) References Cited

U.S. PATENT DOCUMENTS

| | | | |
|---|---|---|---|
| 6,432,463 B1 * | 8/2002 | Bhaskar | A23L 19/19 |
| | | | 426/496 |
| 6,599,547 B1 * | 7/2003 | Martinez-Serna Villagran | A23B 7/022 |
| | | | 426/637 |
| 7,695,746 B2 | 4/2010 | Bows et al. | |
| 7,867,533 B2 | 1/2011 | Bows et al. | |
| 7,993,693 B2 | 8/2011 | Bows et al. | |
| 8,277,858 B2 | 10/2012 | Bows et al. | |
| 8,277,865 B2 * | 10/2012 | Bunke | A23L 19/09 |
| | | | 426/520 |
| 8,778,442 B2 | 7/2014 | Khan et al. | |
| 11,445,737 B2 | 9/2022 | Zhu et al. | |
| 2007/0087107 A1 | 4/2007 | Borders et al. | |
| 2007/0243301 A1 | 10/2007 | Barnett et al. | |
| 2010/0215826 A1 | 8/2010 | Campbell et al. | |
| 2010/0266734 A1 | 10/2010 | Bows et al. | |
| 2011/0064854 A1 | 3/2011 | Bows et al. | |
| 2011/0256277 A1 | 10/2011 | Bows et al. | |
| 2013/0052313 A1 | 2/2013 | Lamikanra et al. | |
| 2013/0156893 A1 | 6/2013 | Han | |
| 2015/0359249 A1 | 12/2015 | Matasovsky et al. | |
| 2015/0366248 A1 | 12/2015 | Yang et al. | |
| 2018/0132513 A1 | 5/2018 | Mohmood | |
| 2019/0191725 A1 | 6/2019 | Gladden et al. | |
| 2019/0246653 A1 | 8/2019 | Gladden et al. | |
| 2019/0269150 A1 | 9/2019 | Coomes et al. | |
| 2021/0068420 A1 | 3/2021 | Zhu et al. | |
| 2021/0298321 A1 | 9/2021 | Mendizabal et al. | |
| 2022/0192241 A1 | 6/2022 | Saibene et al. | |
| 2022/0240555 A1 | 8/2022 | Fuentes et al. | |

FOREIGN PATENT DOCUMENTS

| | | | |
|---|---|---|---|
| EP | 3496541 | 5/2021 | |
| EP | 3496541 B1 * | 5/2021 | A21D 13/02 |
| WO | 2017/167644 | 10/2017 | |

OTHER PUBLICATIONS

"Potatoes, mashed, dehydrated, flakes without milk, dry form"; Nutritional data obtained from https://fdc.nal.usda.govhttps://fdc. nal.usda.gov/food-details/170445/nutrients. FDC publication date Apr. 1, 2019 (Year: 2019).*

International Search Report and Written Opinion issued on Jul. 2, 2024 in PCT/US2024/022735.

* cited by examiner

10

VEGETABLE CONTAINING SNACK PRODUCT

Methods of making a vegetable containing snack product, a dough for forming the vegetable snack product, and a vegetable snack product are described. The vegetable containing snack product contains at least about 15% real vegetables, e.g., legumes, pulses, and vegetables, other than potatoes and corn.

BACKGROUND

Increasingly, consumers seek snack products that provide a variety of tastes and textures and may be perceived as "healthy". To that end, in the field of snack foods there has been a recent focus on producing snack foods that contain vegetable and/or fruit matter. A challenge to producing snack foods that contain vegetable matter is to provide an organoleptically pleasing product while providing a significant amount of vegetable matter, other than potatoes and corn, for which consumers are abundantly familiar with in the form of potato and corn chips. Thus, there is a need to provide snack food that contain more than an insignificant amount of real vegetables other than potatoes and corn, i.e., at least about 15% real vegetables.

SUMMARY

A method of making a vegetable snack product that contains a significant amount of real vegetables is described. The method may include forming a dry mix containing from about 50% to about 60% of a base starch ingredient, from about 20% to about 40% whole vegetable flour, where the vegetable flour is from a source other than potato or corn, from about 2% to about 12% corn flour, and from about 0.2% to about 5% of vegetable powder (where the vegetable powder is from a source other than potato or corn). The base starch ingredient may include one or more of a potato starch, potato-based ingredient, and/or potato flakes. The whole vegetable flour may be from any suitable vegetable flour other than potato or corn and, in some instances, is free of decorticated (e.g., dehulled) flours. For example, the whole vegetable flour may be provided by one or more of whole chickpea flour, whole pea flour, and/or whole yellow pea flour.

The dry mix may be preconditioned by hydrating the dry mix with moisture to form a dough containing from about 30% to about 37% moisture. Following preconditioning, the dough may be extruded to form an extruded sheet having a thickness in the range of about 0.5 mm to about 3.0 mm.

The extruded sheet may then be optionally perforated and thereafter, tempered to a temperature in a range of about 25° C. to about 35° C. with a moisture content between about 9% to about 13%, after which the extruded sheet may be joined with one or more similar extruded sheets. The joined sheets may then be cut, which may form individual snack-sized pieces and/or clusters of individual snack-sized pieces. Thereafter, the individual snack-sized pieces and/or clusters of individual snack-sized pieces are fried, causing the joined sheets that formed the individual snack-sized pieces to expand and form a three-dimensional shape which, if the extruded sheet has been perforated, will contain perforations.

It is contemplated that the formed three-dimensional vegetable snack product may include two or more layers, (e.g., two, three, four, etc). Additionally or alternatively, one or more or all of the layers may include perforations (i.e., holes passing through one or more of the layers).

The resulting vegetable snack product in an unseasoned state (i.e., does not contain an applied seasoning such as, but not limited to a topical seasoning) may contain from about 30% to about 50% of a base starch, from about 15% to about 36% whole vegetable flour (where the vegetable flour is from a source other than potato or corn), from about 1% to about 10% corn flour, and from about 0.5% to about 5% of vegetable powder (where the vegetable powder is from a source other than potato or corn), with about 1% to about 4% moisture. It is also contemplated that the vegetable snack product contains one or more natural colorants such as turmeric extract, annatto extract, beet powder, tomato powder, spinach powder, kale powder, broccoli powder, and/or carrot powder. The vegetable snack product may contain from about 4 to about 8 grams of protein in 100 grams of the vegetable snack product. In addition, the resulting vegetable snack product may be identified or marketed as being made with or containing "real vegetables".

In some aspects the resulting vegetable snack product may contain at least about 15% real vegetables (other than potatoes and corn). As used in the description and claims, the phrase "real vegetables" refers to vegetables other than potatoes and corn and refers to vegetables in a dried, powdered, and particulate state such as, for example, flour. With this in mind, the phrase "real vegetables" is intended to exclude whole, cut, diced, raw, cooked, or dried vegetables having a particle size greater than about 500 μm.

It is contemplated that the resulting vegetable snack product may be flavored by applying, topically or otherwise, one or more seasonings to the vegetable snack product in any known manner. When applied, the seasoning or seasonings may comprise from about 1% to about 10%, in the aggregate, of the vegetable snack product.

The vegetable snack product may have a bulk density between about 60 g/L to about 84 g/L. In some embodiments such as in an unseasoned state, i.e., after creation of the vegetable snack product and prior to the application of seasoning, the vegetable snack product may have a bulk density between about 60 g/L to about 72 g/L. In other aspects, a seasoned three dimensional vegetable snack product may have a bulk density between about 62 g/L to about 84 g/L.

In one aspect, a dough suitable for creating an extrudable sheet product that can be further processed to form a vegetable snack product includes at least about 15% real vegetables, e.g., legumes, pulses, and vegetables other than potatoes and corn. To that end, as used in this description, reference to vegetables and amounts of vegetables refers to amounts of vegetables other than potatoes and corn, i.e., reference to vegetable is specifically meant to exclude potato and corn. In other words, while the dry mix, dough, and/or resulting vegetable snack product may contain some form of potato or corn, the described dry mix, dough, and vegetable snack product, contain less than 100% of potato and potato-based ingredients and, in some instances, less than about 70% of potato and potato-based ingredients such as potato flour, dried potatoes, potato starch, or other potato or potato-based ingredients. Similarly, while the described dry mix, dough, and vegetable snack product may contain some form of corn, e.g., corn flour, the dry mix, dough, and vegetable snack product contain less than 100% corn and corn-based ingredients and, in some instances less than about 20%, or in some instances less than about 12% of corn and corn-based ingredients such as corn flour.

With the above in mind, a dough suitable for forming the vegetable snack product is formed from about 63% to about 69% of a dry mix and from about 31% to about 36% moisture. In this instance, the dry mix includes from about 55% to about 65% of a base starch ingredient, from about 20% to about 40% whole vegetable flour (where the vegetable flour is from a source other than potato or corn), from about 3% to about 12% corn flour, and from about 1% to about 5% of vegetable powder (where the vegetable powder is from a source other than potato or corn).

The base starch ingredient may include one or more of a potato starch, potato-based ingredient, and/or potato flakes. The whole vegetable flour may be from any suitable vegetable flour (other than potato and corn) and, in some instances, is free of decorticated (e.g., dehulled) flours. For example, the whole vegetable flour may be provided by one or more of whole chickpea flour, whole pea flour, and/or whole yellow pea flour. In this regard, the use of a whole vegetable flour as compared to decorticated vegetable flours may be more nutritionally desirable since they may contain a higher fiber content, beneficial vitamins, and/or bioactive components. In addition, it has been found that the use of pre-cooked (pre-gel) whole vegetable flours does not lead to desirable extruded sheets. Accordingly, the described dry mix, doughs, and the vegetable snack product are free of pre-cooked (pre-gel) whole vegetable flours.

In one aspect, it is contemplated to provide a package that contains a variety of the described snack products to provide a pleasing multi-colored snack product in a single package while providing a significant amount of real vegetables. For example, a single package may contain a plurality of yellow or natural colored vegetable snack products, green colored vegetable snack products and orange, orange-red, or red colored vegetable snack products. It is also contemplated that the package may contain other colored vegetable snack products. Of course, a single package may contain a single color of the vegetable snack product.

According to aspects of the described methods and products, the vegetable snack product is free of gluten and/or gluten-containing substances. In addition, it will be appreciated and it is contemplated that because the described vegetable snack product is formulated to have a bulk density within the range of about between about 60 g/L to about 84 g/L, it will be free of and will not contain pieces or particles of vegetable (or fruit), whether fresh, dehydrated, or present in some other form other than flours or powders. Advantageously, the desired bulk density is achieved in the absence of any leavening agents and, as such, it is contemplated that doughs and the vegetable snack product are free of leavening agents.

Additionally, it is contemplated that the described dough and vegetable snack product is free of exogenous fibers, proteins, and/or sugars. Exogenous fiber refers to fiber that is added to the dry mix or dough in contrast to fiber that that is naturally present in the ingredients forming the described dry mix, dough, and vegetable snack product, which is considered to be intrinsic (or endogenous) fiber. Examples of exogenous fiber may be inulin and polydextrose, which are excluded from the described dry mix, dough, and vegetable snack product. Similarly, it is contemplated that the described dough and vegetable snack product is free of exogenous protein. Exogenous protein refers to protein that is added to the dough in contrast to protein that that is naturally present in ingredients forming the described dough and vegetable snack product (i.e., protein naturally or intrinsically present in, for example, chickpea flour), which is considered to be intrinsic (or endogenous) protein. An example of exogenous protein is albumin. Further, it is contemplated that the described dough and vegetable snack product is free of exogenous sugar. Exogenous sugar refer to sugar that is added to the dough (e.g., corn syrup, sugar, cane sugar, etc.) in contrast to sugar that may be naturally present in ingredients forming the described dry mix, dough, and vegetable snack product (i.e., fructose, sucrose and glucose naturally or intrinsically present in, for example, potatoes and potato-based ingredients).

All percentages recited above and in the following description and claims are percent by weight unless specifically noted otherwise. Other aspects and advantages of this invention will be appreciated from the following detailed description.

DETAILED DESCRIPTION OF THE INVENTION

Figure 1:
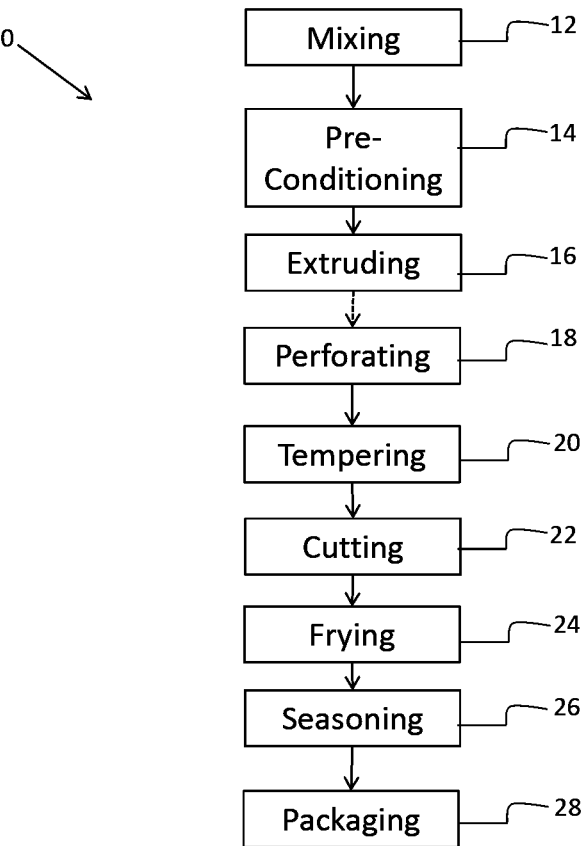
FIG. 1 illustrates one method of preparing a vegetable snack product and particularly a three dimensional snack product according to the described embodiments.
Figure 2:
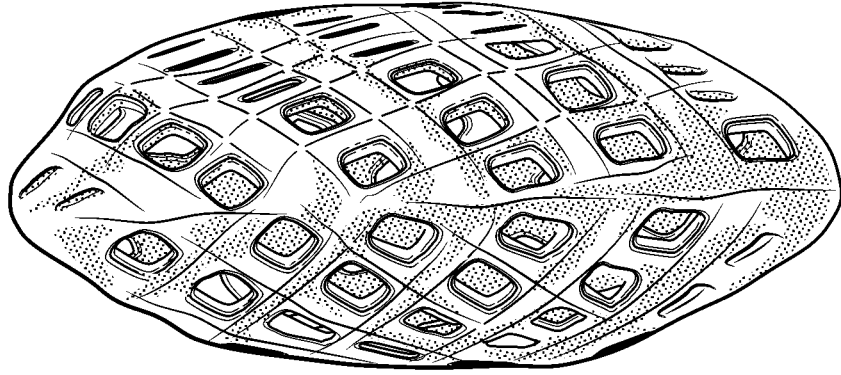
FIG. 2 is a view of a perspective view of an exemplary three dimensional vegetable snack product made according to the described methods.

Referring to FIG. 1, an exemplary method 10 for preparing a vegetable snack product is shown. The method 10 includes mixing 12 a plurality of dry ingredients to provide a dry mix. The dry mix can then be pre-conditioned 14 such as by adding water in the absence of steam injection or heat to provide dough having a moisture content between about 31% to about 37%. The dough may then be extruded 16 in a known manner to form an extruded sheet having a thickness in the range of about 0.5 mm to about 3.0 mm. In some instances, the extruded sheet may be perforated 18 and thereafter tempered 20 and cut 22 to form individual snack-sized pieces and clusters of individual snack-sized pieces that are then fried 24 to produce the vegetable snack product. The vegetable snack product may then be seasoned 26 and then packaged 28.

As noted above, the dry mix may include from about 50% to about 69% of a base starch ingredient, from about 20% to about 40% whole vegetable flour (where the vegetable flour is from a source other than potato or corn), from about 3% to about 12% corn flour, and from about 0.2% to about 5% of vegetable powder (where the vegetable powder is from a source other than potato or corn).

Base Starch

The base starch may include any suitable starch so long as it does not include gluten. With that in mind, however, it has been found that a suitable product can be formed when the base starch includes potato and potato-based ingredients such as potato flour, dried potatoes, potato starch, or other potato or potato-based ingredients. The dry mix includes from about 50% to about 69% of a base starch ingredient, or about 51%, 52%, 53%, 54%, 55%, 56%, 57%, 58%, 59%, 60%, 61% 62%, 63%, 64%, 65%, 66% 67%, or about 68%. In some aspects, the base starch ingredient may be present in the dry mix in a range where the lower limit may be from any one of about 50%, 51%, 52%, 53%, 54%, 55%, 56%, 57%, 58%, 59%, 60%, 61% 62%, 63%, 64%, 65%, 66% 67%, 68%, while the upper limit may be from anyone of about 51%, 52%, 53%, 54%, 55%, 56%, 57%, 58%, 59%, 60%, 61% 62%, 63%, 64%, 65%, 66% 67%, 68%, or about 69%.

In some aspects, the base starch comprises, consists essentially of, or consists of a mixture of potato starch and potato flakes. In these aspects, a ratio of potato starch to potato flakes may be in the range of about 9:1 to about 12:1. To this end, the potato starch may be included in the dry mix in amounts ranging from about 50% to about 60%, or about 51%, 52%, 53%, 54%, 55%, 56%, 57%, 58%, or about 59%. In some embodiments, the potato starch may be present in the dry mix in a range where the lower limit may be from any one of about 50%, 51%, 52%, 53%, 54%, 55%, 56%, 57%, 58%, 59%, while the upper limit may be from anyone of about 51%, 52%, 53%, 54%, 55%, 56%, 57%, 58%, 59%, or about 60%. Also, in these aspects, the potato flakes may be included in the dry mix in amounts ranging from about 1% to about 9%, or about 2%, 3,%, 4%, 5%, 6%, 7%, or about 8%. In some embodiments, the potato flakes may be present in the dry mix in a range where the lower limit may be from any one of about 1%, 2%, 3, %, 4%, 5%, 6%, 7%, 8%, while the upper limit may be from anyone of about 2%, 3,%, 4%, 5%, 6%, 7%, 8%, or about 9%.

In some instances, the potato starch has a maximum moisture content of about 25%, or about 20%. In some instances, the potato flake may contain between about 5% and about 9% moisture and may have a particle size such that no more than about 5%, or no more than about 3%, are greater than about 500 μm and such that no more than about 25%, or no more than about 20% have a particle size less than about 125 μm.

Corn Flour

The dry mix also includes corn flour, which contributes to a desired level of stretchability to the extruded sheets and improves the homogeneity of the extruded sheets. In this regard, it has been found that in the absence of corn flour, the extruded sheets exhibit striations and visible areas of heterogeneity.

While the skilled artisan will appreciate that corn flour is a whole grain it is contemplated that the described dough and vegetable snack product will be free of other whole grains such as wheat, rice, oats, barley, *quinoa*, sorghum, spelt, and rye.

The corn flour is present in the dry mix in a range within about 2% to about 15% or from about 2%, 3%, 4%, 5%, 6%, 7%, 8%, 9%, 10%, 11%, 12%, 13%, 14%, or about 15%. In some aspects, the corn flour may be present in the dry mix in a range where the lower limit may be from any one of about 2%, 3%, 4%, 5%, 6%, 7%, 8%, 9%, 10%, 11%, 12%, 13%, 14%, while the upper limit may be from anyone of about 3%, 4%, 6%, 7%, 8%, 9%, 10%, 11%, 12%, 13%, 14%, or about 15%.

In some instances, the corn flour has a moisture content between about 8% and about 14%, or about 9.0% to about 13.5%. Suitable corn flour may have a particle size such that at least 50% of the particles are smaller than 150 μm. To this end, the corn flour may have a particle size such that no more than about 1% of the particles are larger than about 420 μm, no more than about 10% of the particles are larger than about 250 μm, no more than about 15% to about 35% of the particles being held on a US 100 sieve size (about 150 μm), with the balance passing through US 100 sieve size (about 150 μm).

Real Vegetables

As noted above, the real vegetables are provided as particulates such as a flour, powder, or a mixture of a flour and a powder.

Whole Vegetable Flour

In this instance, the vegetable flour is typically provided as a whole vegetable flour from real vegetable flours selected from legumes, pulses, and vegetables other than potatoes and corn. To that end, as used in this description, reference to vegetables and amounts of vegetables refers to amounts of vegetables other than potatoes and corn, i.e., reference to vegetable is specifically meant to exclude potato and corn. In other words, while the vegetable snack product may contain some form of potato and/or corn, the described dough and vegetable snack product contains less than 100% of potato and potato-based ingredients and, in some instances, less than about 70% of potato and potato-based ingredients such as, but not limited to, potato flour, dried potatoes, potato starch, or other potato or potato-based ingredients.

Similarly, while the vegetable snack product may contain some form of corn, the described dough and vegetable snack product contains less than 100% or less than 70% of corn and corn-based ingredients and, in some instances, less than 16% of corn and corn-based ingredients such as corn flour.

The whole vegetable flour may be from any suitable vegetable flour and, in some instances, is free of decorticated (e.g., dehulled) flours. In this regard, the use of a whole vegetable flour as compared to a decorticated vegetable flours may be more nutritionally desirable since it may contain a higher fiber content, beneficial vitamins and/or bioactive components. In addition, it has been found that the use of pre-cooked (pre-gel) whole vegetable flours do not lead to desirable extruded sheets and thus, leads to undesirable snack products. Accordingly, the described doughs and the vegetable snack product, are free of pre-cooked (pre-gel) whole vegetable flours.

For example, the whole vegetable flour may be provided by one or more of legumes, pulses, and vegetables other than potatoes and corn. Suitable legumes may include but may not be limited to chickpeas, black beans, green peas, yellow peas, lima beans, kidney beans, black-eyed peas, and navy beans. Suitable pulses may include but may not be limited to lentils, fava beans, Bambara beans, pigeon peas, lupins, and vetches. Suitable vegetables other than potatoes and corn may include but may not be limited to carrot, peppers (e.g., green peppers, red peppers, etc.), beets, yams, broccoli, pumpkin, squash, tomato, celery, spinach, zucchini, cucumber, cauliflower, onion, scallion, asparagus, garlic, etc.

The whole vegetable flour may be present in the dry mix in an amount ranging from about 20% to about 40%, or about 21%, 22%, 23%, 24%, 25%, 26%, 27%, 28%, 29%, 30%, 31% 32%, 33%, 34%, 35%, 36% 37%, 38%, or about 39%. In some aspects, the whole vegetable flour may be present in the dry mix in a range where the lower limit may be from any one of about 20%, 21%, 22%, 23%, 24%, 25%, 26%, 27%, 28%, 29%, 30%, 31% 32%, 33%, 34%, 35%, 36% 37%, 38%, 39%, while the upper limit may be from anyone of about 21%, 22%, 23%, 24%, 25%, 26%, 27%, 28%, 29%, 30%, 31% 32%, 33%, 34%, 35%, 36% 37%, 38%, 39%, or about 40%.

In a desired aspect, the whole vegetable flour comprises, consists essentially of, or consists of whole chickpea flour and whole yellow pea flour. In some embodiments, the ratio of the amount of the whole chickpea flour to the amount of the whole yellow pea flour is between about 3:1 to about 1:1. To this end, it was discovered that the presence of whole yellow pea flour provided beneficial organoleptic properties to the resulting vegetable snack product when compared to a vegetable snack product formulated solely with whole chickpea flour. As noted above, neither the whole chickpea flour nor the whole yellow pea flour is corticated or pre-cooked (i.e., pre-gelled). In some instances, the each of the whole chickpea flour and the whole yellow pea flour has a size such that 100% of the particles pass through #40 US Sieve size.

The whole chickpea flour may be present in the dry mix in amounts ranging from about 10%, 11%, 12%, 13%, 14%, 15%, 16%, 17%, 18%, 19%, 20%, 21%, 22%, 23%, 24%, 25%, 26%, 27%, 28%, 29%, or about 30%, In some aspects, the whole chickpea flour may be present in the dry mix in a range where the lower limit may be from any one of about 10%, 11%, 12%, 13%, 14%, 15%, 16%, 17%, 18%, 19%, 20%, 21%, 22%, 23%, 24%, 25%, 26%, 27%, 28%, 29%, while the upper limit may be from anyone of about 11%, 12%, 13%, 14%, 15%, 16%, 17%, 18%, 19%, 20%, 21%, 22%, 23%, 24%, 25%, 26%, 27%, 28%, 29%, or about 30%.

The whole yellow pea flour may be present in the dry mix in amounts ranging from about 5%, 6%, 7%, 8%, 9%, 10%, 11%, 12%, 13%, 14%, or about 15%. In some aspects, the whole yellow pea flour may be present in the dry mix in a range where the lower limit may be from any one of about 5%, 6%, 7%, 8%, 9%, 10%, 11%, 12%, 13%, 14%, while the upper limit may be from anyone of about 6%, 7%, 8%, 9%, 10%, 11%, 12%, 13%, 14%, or about 15%. A suitable yellow pea may have a particle size such that 100% of the particles pass through 20 mesh sieve, i.e., are smaller than about 840 microns, or in some instances, 100% of the particles pass through 40 mesh sieve, i.e., are smaller than about 400 microns. The yellow pea may also have a moisture content between about 9% and 11% or about 10%.

Vegetable Powder

The dry mix may also contain one or more vegetable powders other than potato and corn. When present, it is believed that the vegetable powders may contribute to the resulting color and flavor of the resulting base flavor.

In some instances the vegetable powder may be selected from any one or more of, but are not limited to, turmeric, beet, tomato, spinach, kale, broccoli, carrot, sweet potato, peppers (yellow, green, and red bell peppers, jalapeno, etc.), squash, cauliflower, beans (green, navy, fava), and peas. Depending on the desired color of the vegetable snack product, the vegetable powder may be selected from one or more of tomato, beet, spinach, or kale.

The vegetable powder or powders, when present may be included in the dry mix in amounts, individually or collectively, from about 0.2% to about 5.0%. In some aspects, the vegetable powder or powders, individually or collectively, may be present in the dry mix in a range where the lower limit may be from any one of about 0.2%, 0.3%, 0.4%, 0.5%, 0.6%, 0.7%, 0.8%, 0.9%, 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, 2.7%, 2.8%, 2.9%, 3.0%, 3.1%, 3.2%, 3.3%, 3.4%, 3.5%, 3.6%, 3.7%, 3.8%, 3.9%, 4%, 4.1%, 4.2%, 4.3%, 4.4%, 4.5%, 4.6%, 4.7%, 4.8%, or about 4.9%, while the upper limit may be from anyone of about 0.3%, 0.4%, 0.5%, 0.6%, 0.7%, 0.8%, 0.9%, 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, 2.7%, 2.8%, 2.9%, 3.0%, 3.1%, 3.2%, 3.3%, 3.4%, 3.5%, 3.6%, 3.7%, 3.8%, 3.9%, 4%, 4.1%, 4.2%, 4.3%, 4.4%, 4.5%, 4.6%, 4.7%, 4.8%, 4.9%, or about 5.0%.

Natural Colorants

As noted above, the vegetable powder may impart color to the resulting vegetable snack product. Nevertheless, it is contemplated that additional coloring may be desired. In such instances, it is desired to use natural colorants and to exclude artificial colorants. Natural colorants may include turmeric extract to provide a yellow color or annatto extract to provide a red color. Other natural colorants may be known by the skilled artisan and, as such, are contemplated for inclusion within the dry mix. Depending on the desired color of the vegetable snack product, the vegetable powder may be selected from one or more of tomato, beet (beetroot), spinach, or kale.

When colorants are included in the dry mix, they may be present individually or collectively in amounts from about 0.01% to about 1%, or from about 0.02, %, 0.03%, 0.04%, 0.05%, 0.06%, 0.07%, 0.08%, 0.09%, 0.1%, 0.2%, 0.3%, 0.4%, 0.5%, 0.6%, 0.7%, 0.8% 0.09%, or about 1%.

After the dry mix is prepared by mixing the above ingredients, the dry mix may be preconditioned 14 by adding a sufficient amount of moisture at ambient temperature (about 72° F. to about 80° F.), typically by spraying the water into a rotating bed of the dry mix to form a dough. In some instances, the preconditioning is conducted in the absence of steam or applied heat since it is believed that higher temperatures may deleteriously affect one or more of the ingredients forming the dry mix.

The resulting dough will contain from about 63% to 69% of the above-described dry mix, with the remaining balance being added water or moisture. In this regard, the dough may contain dry mix in an amount from about 63%, 63.5,%, 64%, 64.5%, 65%, 65.5%, 66%, 66.5%, 67% 67.5%, 68%, 68.5%, or about 69%. In some aspects, the dough may contain dry mix in a range where the lower limit may be from any one of about 63%, 63.5,%, 64%, 64.5%, 65%, 65.5%, 66%, 66.5%, 67% 67.5%, 68%, 68.5%, while the upper limit may be from any one of about 63.5, %, 64%, 64.5%, 65%, 65.5%, 66%, 66.5%, 67% 67.5%, 68%, 68.5%, or about 69%, or any range that can be created from these values.

With these ranges and the above description of the dry mix in mind, the skilled artisan can determine the amount of each of the base starch ingredient, whole vegetable flour, vegetable powder, corn flour, and natural colorants that may be present in the dough.

Regarding the moisture content, the dough will contain from about 31% to about 37%, or from about 31.5% to 35.5% or about 32.0%, 32.5%, 33.0%, 33.0%, 33.5%, 34%, 34.5%, or about 35%. In some aspects, the dough may contain moisture in a range where the lower limit may be from any one of 31.5% or about 32.0%, 32.5%, 33.0%, 33.0%, 33.5%, 34%, 34.5%, while the upper limit may be from any one of about 32.0%, 32.5%, 33.0%, 33.0%, 33.5%, 34%, 34.5%, or about 35%, or 35.5%. When the dough contains a moisture content that is outside of the above ranges, it is has been found that an unsuitable vegetable snack results. In some, instances, when the moisture content is outside the above ranges, the resulting vegetable snack product does not possess the desired bulk density range, as further discussed below.

Following preconditioning, the dough is subjected to extruding 16 by introducing (in some instances, immediately after formation of the dough) the dough into an extruder, which may be a single screw or a multi-screw extruder that is capable of delivering a specific mechanical energy of about 50 to about 75 W-h/kg dough, or from about 50, 51, 52, 53, 54, 55, 56, 57, 58, 59, 60, 61, 62, 63, 64, 65, 66, 67, 68, 69, 70, 71, 72, 73, 74, or about 75 W-h/kg dough, or any range that can be created by the previous individual numbers. The extruder may be configured with multiple zones such that the temperature at the beginning or entrance of the extruder is between about 70° C. and 90° C. and the temperature at the end or output of the extruder ranges from about 80° C. to about 120° C. The residence time may range from about 1 second to about 600 seconds.

The extruder is configured with a die head (die slot) to form a continuous sheet having a width between about 2 in. to about 24 in., or from about 2, 3, 4, 5, 6, 7, 8, 9, 10, 11, 12, 13, 14, 15, 16, 17, 18, 19, 20, 21, 22, 23, or about 24 in. In addition, the continuous sheet may have a thickness between about 0.2 mm to about 2 mm, or about 0.3, 0.4, 0.5, 0.6, 0.7, 0.8, 0.9, 1.0, 1.1, 1.2, 1.3, 11.4, 1.5, 1.6, 1.7, 1.8, 1.9, or about 2.0 mm. In commercial practice there may be more than a single extruder such that more than a single sheet is simultaneously produced.

The extruded sheet or sheets may then be optionally perforated to create holes in the sheets which will then be present in the resulting snack. In this regard, as will become evident one or more of the extruded sheets may be perforated.

After perforating, the sheets are tempered 20 to a temperature between about 25° C. and about 35° C. and a moisture content between about 9% to about 13%, after which two or more sheets may be optionally joined and then cut 22 to form individual snack sized pieces or clusters of individual snack sized pieces each having a moisture content between about 9% to about 13%. In one instance two sheets are joined. It is contemplated that more than two sheets may be joined such as, for example, three, four, or more. Additionally or alternatively, one or more or all of the layers may include perforations (i.e., holes passing through one or more of the layers).

Thereafter, the individual snack sized pieces and clusters of individual snack-sized pieces are fried 24 in oil. Where, the sheets are joined as described above, the frying will cause a central portion of the individual snack sized piece to separate from each other and to form a three dimensional vegetable snack product. The individual snack sized pieces may be fried in any suitable vegetable oil such as corn, canola, safflower, sunflower, and the like. General frying conditions are known to those skilled in the art and need not be elaborated.

After frying 24, the produced vegetable snack product pieces may be seasoned 26 by application of one or more seasonings or flavorings applied to the surfaces of the individual vegetable snack product pieces in a known manner. It will be appreciated that any number of seasoning or flavoring particles or compositions may be applied. By way of example without intending to limit the scope of this disclosure, the additional seasoning or flavoring, may comprise sodium chloride, table salt, kosher salt, sea salt, pepper, paprika, dill, cinnamon, sugar, cardamom, ginger, mustard, parsley, sage, thyme, ranch, barbeque, cheese, vinegar, honey, sour cream, onion, jalapeno, chile limon, limon, dill pickle, adobadas, and any combination thereof.

In some embodiments, seasoning or flavoring may be added in minor amounts of no more than an average amount of about 10% per individual snack sized piece, depending on the type of flavor profile desired. In this regard, the seasoning or flavoring may be present on the vegetable snack product in an amount ranging from about 1% to about 10%, or about 1%, 2%, 3%, 4%, 5%, 6%, 7%, 8%, 9%, or about 10%. In some aspects, the seasoning or flavoring may be present on the vegetable snack product in a range where the lower limit may be from any one of about 1%, 2%, 3%, 4%, 5%, 6%, 7%, 8%, 9%, while the upper limit may be from anyone of about 2%, 3%, 4%, 5%, 6%, 7%, 8%, 9%, 6%, 7%, 8%, 9%, or about 10%.

Thereafter, the vegetable snack product pieces (whether seasoned or not) are packaged into a suitable package. The package may contain only single type (i.e., a single color) of vegetable snack product or may contain more than one type (i.e., more than a single color) of vegetable snack product.

Resulting Vegetable Snack Product

The resulting vegetable snack product may contain from about 30% to about 50% of a base starch, from about 2% to about 10% corn flour, from about 15% to about 35% whole vegetable flour, from about 1% to about 5% of vegetable powder, from about 0.01% to about 1.0% natural colorants, from about 1% to about 4% moisture, with the remaining being oil, which typically is present in an amount less than about 35%, or less than about 30%.

With this in mind, the resulting vegetable snack product may contain from about 30% to about 50% of a base starch ingredient, or about 31%, 32%, 33%, 34%, 35%, 36%, 37%, 38%, 39%, 40%, 41% 42%, 43%, 44%, 45%, 46% 47%, 48%, or about 49%. In some aspects, the base starch ingredient may be present in the dry mix in a range where the lower limit may be from any one of about 30%, 31%, 32%, 33%, 34%, 35%, 36%, 37%, 38%, 39%, 40%, 41% 42%, 43%, 44%, 45%, 46% 47%, 48%, while the upper limit may be from anyone of about 31%, 32%, 33%, 34%, 35%, 36%, 37%, 38%, 39%, 40%, 41% 42%, 43%, 44%, 45%, 46% 47%, 48%, 49%, or about 50%.

To this end, the base starch consists essentially of, or consists of a mixture of potato starch and potato flakes. In these aspects, a ratio of potato starch to potato flakes may be in the range of about 9:1 to about 12:1. Accordingly, the potato starch may be present in the vegetable snack product in amounts ranging from about 25% to about 45%, or about 26%, 27, 28%, 29%, 30%, 31%, 32%, 33%, 34%, 35%, 36%, 37% 38% 39%, 40%, 41%, 42%, 43%, or about 44%. In some embodiments, the potato starch may be present in the vegetable snack product in a range where the lower limit may be from any one of about 25%, 26%, 27, 28%, 29%, 30%, 31%, 32%, 33%, 34%, 35%, 36%, 37% 38% 39%, 40%, 41%, 42%, 43%, or about 44%, while the upper limit may be from anyone of about 26%, 27, 28%, 29%, 30%, 31%, 32%, 33%, 34%, 35%, 36%, 37% 38% 39%, 40%, 41%, 42%, 43%, 44%, or about 45%. Also, in these aspects, the potato flakes may be included in the vegetable snack product in amounts ranging from about 1% to about 9%, or about 2%, 3,%, 4%, 5%, 6%, 7%, or about 8%. In some embodiments, the potato flakes may be present in the vegetable snack product in a range where the lower limit may be from any one of about 1%, 2%, 3, %, 4%, 5%, 6%, 7%, 8%, while the upper limit may be from anyone of about 2%, 3,%, 4%, 5%, 6%, 7%, 8%, or about 9%.

The corn flour may be present in the vegetable snack product in amounts ranging from about 2% to about 10%. In some embodiments, the corn flour may be present in the vegetable snack product in a range where the lower limit may be from any one of about 2%, 3,%, 4%, 5%, 6%, 7%, 8%, while the upper limit may be from anyone of about 3%, 3,%, 4%, 5%, 6%, 7%, 8%, or about 9%.

The whole vegetable flour may be present in the vegetable snack product in an amount ranging from about 15% to about 35%, or about 16%, 17%, 18%, 19%, 20% 21%, 22%, 23%, 24%, 25%, 26%, 27%, 28%, 29%, 30%, 31% 32%, 33%, or about 34%. In some aspects, the whole vegetable flour may be present in the vegetable snack product in a range where the lower limit may be from any one of about 15%, 16%, 17%, 18%, 19%, 20%, 21%, 22%, 23%, 24%, 25%, 26%, 27%, 28%, 29%, 30%, 31% 32%, 33%, or 34%, while the upper limit may be from anyone of about 16%, 17%, 18%, 19%, 20%, 21%, 22%, 23%, 24%, 25%, 26%, 27%, 28%, 29%, 30%, 31% 32%, 33%, 34%, or about 35%.

In some embodiments, the ratio of the amount of the whole chickpea flour to the amount of the whole yellow pea flour is between about 3:1 to about 1:1. To this end, the whole chickpea flour may be present in the vegetable snack product dry mix amounts ranging from about 10%, 11%, 12%, 13%, 14%, 15%, 16%, 17%, 18%, 19%, or about 20%. In some aspects, the whole chickpea flour may be present in the vegetable snack product in a range where the lower limit may be from any one of about 10%, 11%, 12%, 13%, 14%, 15%, 16%, 17%, 18%, or 19%, while the upper limit may be from anyone of about 11%, 12%, 13%, 14%, 15%, 16%, 17%, 18%, 19%, or about 20%.

The whole yellow pea flour may be present in the vegetable snack product mix in amounts ranging from about 1% to about 10%, or about 1%, 2%, 3%, 4%, 5%, 6%, 7%, 8%, 9%, or about 10%. In some aspects, the whole yellow pea flour may be present in the vegetable snack product in a range where the lower limit may be from any one of about 1%, 2%, 3%, 4%, 5%, 6%, 7%, 8%, 9%, while the upper limit may be from anyone of about 2%, 3%, 4%, 5%, 6%, 7%, 8%, 9%, 6%, 7%, 8%, 9%, or about 10%.

The vegetable powder or powders, when present may be included in the dry mix in amounts, individually or collectively, from about 0.2% to about 5.0%. In some aspects, the vegetable powder or powders, individually or collectively, may be present in the vegetable snack product in a range where the lower limit may be from any one of about 0.2%, 0.3%, 0.4%, 0.5%, 0.6%, 0.7%, 0.8%, 0.9%, 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, 2.7%, 2.8%, 2.9%, 3.0%, 3.1%, 3.2%, 3.3%, 3.4%, 3.5%, 3.6%, 3.7%, 3.8%, 3.9%, 4%, 4.1%, 4.2%, 4.3%, 4.4%, 4.5%, 4.6%, 4.7%, 4.8%, or about 4.9%, while the upper limit may be from anyone of about 0.3%, 0.4%, 0.5%, 0.6%, 0.7%, 0.8%, 0.9%, 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, 2.7%, 2.8%, 2.9%, 3.0%, 3.1%, 3.2%, 3.3%, 3.4%, 3.5%, 3.6%, 3.7%, 3.8%, 3.9%, 4%, 4.1%, 4.2%, 4.3%, 4.4%, 4.5%, 4.6%, 4.7%, 4.8%, 4.9%, or about 5.0%.

Colorants, when present, may be present in the vegetable snack product, individually or collectively, in amounts from about 0.01% to about 1%, or from about 0.02, %, 0.03%, 0.04%, 0.05%, 0.06%, 0.07%, 0.08%, 0.09%, 0.1%, 0.2%, 0.3%, 0.4%, 0.5%, 0.6%, 0.7%, 0.8% 0.09%, or about 1%.

The vegetable snack product contains at least about 15% real vegetables (other than potatoes and corn) or from about 15%, 16%, 17%, 18%, 19%, 20%, 21%, 22%, 23%, 24%, 25%, 26%, 27%, 28%, 29%, or about 30%. Put another way, the amount of whole vegetable flour and vegetable powder present in the vegetable snack product is sufficient to provide at least 15% real vegetables. In addition, it is contemplated that packaging containing the described vegetable snack product may contain a label reciting, "made with real vegetables".

In addition, the resulting vegetable snack product may provide from about 4 to about 8 grams of protein per 100 grams of the vegetable snack product. In some instances, the snack product may provide from about 4, 5, 6, 7, or about 8 grams of protein per 100 grams of the vegetable snack product.

The vegetable snack product may have a bulk density between about 60 g/L to about 84 g/L. In some embodiments such as in an unseasoned state, i.e., prior to application of seasoning, the vegetable snack product may have a bulk density between about 60 g/L to about 72 g/L. In these instances, the vegetable snack product may have a bulk density from about 60, 61, 62, 63, 64, 65, 66, 67, 68, 69, 70, 71, or about 72 g/L. In some aspects, the unseasoned vegetable snack product be in a range where the lower limit may be from any one of about 60, 61, 62, 63, 64, 65, 66, 67, 68, 69, 70, 71 g/L, while the upper limit may be from anyone of about 61, 62, 63, 64, 65, 66, 67, 68, 69, 70, 71 or about 72 g/L.

In other aspects, a seasoned vegetable snack product may have a bulk density between about 62 g/L to about 84 g/L. In these instances, the seasoned vegetable snack product may have a bulk density from about 62, 63, 64, 65, 66, 67, 68, 69, 70, 71, 72, 73, 74, 75, 76, 77, 78, 79, 80 81, 82, 83, or about 84 g/L. In some aspects, the seasoned vegetable snack product be in a range where the lower limit may be from any one of about 62, 63, 64, 65, 66, 67, 68, 69, 70, 71, 72, 73, 74, 75, 76, 77, 78, 79, 80 81, 82, 83 g/L, while the upper limit may be from anyone of about 63, 64, 65, 66, 67, 68, 69, 70, 71, 72, 73, 74, 75, 76, 77, 78, 79, 80 81, 82, 83, or about 84 g/L.

Where an embodiment is described as comprising some element or group of elements, additional embodiments can consist essentially of or consist of the element or group of elements. Also, although the open-ended term "comprises" is generally used in this description, additional embodiments can be formed by substituting the terms "consisting essentially of" or "consisting of."

Additionally, when a range for a particular variable is given for an embodiment, an additional embodiment can be created using a subrange or individual values that are contained within the range. Moreover, when a value, values, a range, or ranges for a particular variable are given for one or more embodiments, an additional embodiment can be created by forming a new range whose endpoints are selected from any expressly listed value, any value between expressly listed values, and any value contained in a listed range. For example, if the application were to disclose an embodiment in which a variable is 1 and a second embodiment in which the variable is 3-5, a third embodiment can be created in which the variable is 1.31-4.23. Similarly, a fourth embodiment can be created in which the variable is 1-5.

While the invention has been described in terms of specific or particular embodiments, it should be apparent that alternatives could be adopted by one skilled in the art. In addition, the invention encompasses additional or alternative embodiments in which one or more features or aspects of a particular embodiment could be eliminated or two or more features or aspects of different disclosed embodiments could be combined. Accordingly, it should be understood that the invention is not necessarily limited to any embodiment described herein or illustrated in the drawings. It should also be understood that the purpose of the above detailed description and the phraseology and terminology employed therein is to describe the illustrated embodiments, and not necessarily to serve as limitations to the scope of the invention. Finally, while the appended claims recite certain aspects believed to be associated with the invention, they do not necessarily serve as limitations to the scope of the invention.

The invention claimed is:

1. A method of making a vegetable snack product comprising:

a. providing a dry mix that includes from about 50 wt. % to about 69 wt. % of a base starch that consists essentially of a mixture of potato starch and potato flakes wherein a ratio of potato starch to potato flakes is in the range of about 9:1 to 12:1 by weight and wherein the base starch is free of gluten; from about 3 wt. % to about 12 wt. % of corn flour; from about 20 wt. % to about 40 wt. % of whole vegetable flour other than potato and corn; and from about 1 wt. % to about 5 wt. % of vegetable powder other than potato and corn, wherein the vegetable powder differs from the whole vegetable flour;

b. hydrating the dry mix to form a dough containing from 31-37 wt. % of moisture;

c. introducing the dough to an extruder and applying a specific mechanical energy of about 50 W-h/kg to about 75 W-h/kg dough;

d. extruding the dough through a die slot to form a continuous sheet having a width between about 2 in. and about 24 in. and having a thickness in the range of about 0.2 mm to about 2.0 mm e. cutting the sheet to form individual snack sized pieces and/or clusters of individual snack-sized pieces; and f. frying the individual snack sized pieces to form the vegetable snack product having at least 15 wt. % of real vegetables exclusive of potato and corn and a bulk density between about 60 g/L to about 84 g/L.

2. The method of claim 1 further comprising, prior to cutting, perforating the sheet and tempering the perforated sheet to a temperature within a range between about 25° C. to about 35° C.

3. The method of claim 2 further comprising, after tempering, joining one or more sheets prior to cutting such that after frying a three dimensional vegetable snack product is created.

4. The method of claim 1, wherein the base starch consists of a mixture of potato starch and potato flakes.

5. The method of claim 1, wherein the whole vegetable flour is selected from one or more of chickpeas, black beans, green peas, yellow peas, lima beans, kidney beans, black-eyed peas, Bambara beans, pigeon peas, lupins, vetches, yams, pumpkin, celery, zucchini, cucumber, onion, scallion, asparagus, or garlic.

6. The method of claim 5, wherein the vegetable powder is selected from one or more of turmeric, beet, tomato, spinach, kale, broccoli, carrot, sweet potato, peppers, squash, cauliflower, green beans, navy beans, or fava beans.

7. The method of claim 6 wherein the vegetable powder is selected from one or more of tomato, beet, spinach or kale.

8. The method of claim 1, wherein the whole vegetable flour includes a mixture of whole chickpea flour and whole yellow pea flour.

9. The method of claim 8, wherein a ratio of an amount of whole chickpea flour to an amount of whole yellow pea flour is between about 3:1 and 1:1 by weight.

10. A method of making a vegetable snack product comprising:

a. providing a dry mix that includes
   (i) from about 50 wt. % to about 69 wt. % of a base starch that consists essentially of a mixture of potato starch and potato flakes wherein a ratio of potato starch to potato flakes is in the range of about 9:1 to 12:1 by weight and wherein the base starch is free of gluten;
   (ii) from about 3 wt. % to about 12 wt. % of corn flour;
   (iii) from about 20 wt. % to about 40 wt. % of whole vegetable flour selected from one or more of chickpeas, black beans, green peas, yellow peas, lima beans, kidney beans, black-eyed peas, Bambara beans, pigeon peas, lupins, vetches, yams, pumpkin, celery, zucchini, cucumber, onion, scallion, asparagus, or garlic; and
   (iv) from about 1 wt. % to about 5 wt. % of vegetable powder selected from one or more of turmeric, beet, tomato, spinach, kale, broccoli, carrot, sweet potato, peppers, squash, cauliflower, green beans, navy beans, or fava beans;

b. hydrating the dry mix to form a dough containing from 31-37 wt. % of moisture;

c. introducing the dough to an extruder and applying a specific mechanical energy of about 50 W-h/kg to about 75 W-h/kg dough;

d. extruding the dough through a die slot to form a continuous sheet having a width between about 2 in. and about 24 in. and having a thickness in the range of about 0.2 mm to about 2.0 mm e. cutting the sheet to form individual snack sized pieces and/or clusters of individual snack-sized pieces; and f. frying the individual snack sized pieces to form the vegetable snack product having at least 15 wt. % of real vegetables exclusive of potato and corn and a bulk density between about 60 g/L to about 84 g/L.

* * * * *